United States Patent [19]

Craemer

[11] Patent Number: 4,550,377

[45] Date of Patent: Oct. 29, 1985

[54] PROXIMITY FLUTE DETECTION

[75] Inventor: Robert H. Craemer, Cherry Hill, N.J.

[73] Assignee: Molins Machine Company, Inc., Cherry Hill, N.J.

[21] Appl. No.: 544,922

[22] Filed: Oct. 24, 1983

[51] Int. Cl.[4] .......................... G06F 15/46; G05D 5/00

[52] U.S. Cl. .......................................... 364/471; 156/64; 156/205; 156/378; 250/571; 364/562; 377/19; 377/24

[58] Field of Search ........................ 364/471, 561, 562; 156/64, 351, 361, 367, 378, 462, 470, 205; 250/548, 559, 560, 571; 356/429; 377/8, 15, 16, 17, 18, 19, 24, 26; 162/254, 262, 263

[56] References Cited

U.S. PATENT DOCUMENTS

| | | | |
|---|---|---|---|
| 3,104,997 | 9/1963 | Stewart et al. | 156/378 |
| 3,411,388 | 11/1968 | Rappaport | 156/64 X |
| 3,966,518 | 6/1976 | Ferara | 156/64 |
| 3,970,489 | 7/1976 | Schmidt et al. | 156/64 |
| 3,977,929 | 8/1976 | Evans | 156/64 |
| 4,015,493 | 4/1977 | Woolston | 364/475 X |
| 4,151,403 | 4/1979 | Woolston | 364/562 |
| 4,174,237 | 11/1979 | Hemming, Jr. | 364/471 X |
| 4,497,027 | 1/1985 | McGuire et al. | 364/471 |

*Primary Examiner*—Joseph Ruggiero

*Attorney, Agent, or Firm*—Seidel, Gonda, Goldhammer

[57] ABSTRACT

Proximity type sensors detect the passage of the flutes of a single face web at the inlet and outlet of a bridge. Separate counts are maintained of the number of flutes detected at the bridge inlet and outlet based on the outputs of the sensors. Data representative of the number of flutes per unit length of one or more single face webs is stored in memory. The appropriate data is selectively retrieved from memory and multiplied by the difference between the flute counts at the bridge inlet and outlet to obtain a signal representative of actual length of web on the bridge.

16 Claims, 8 Drawing Figures

FIG. 1
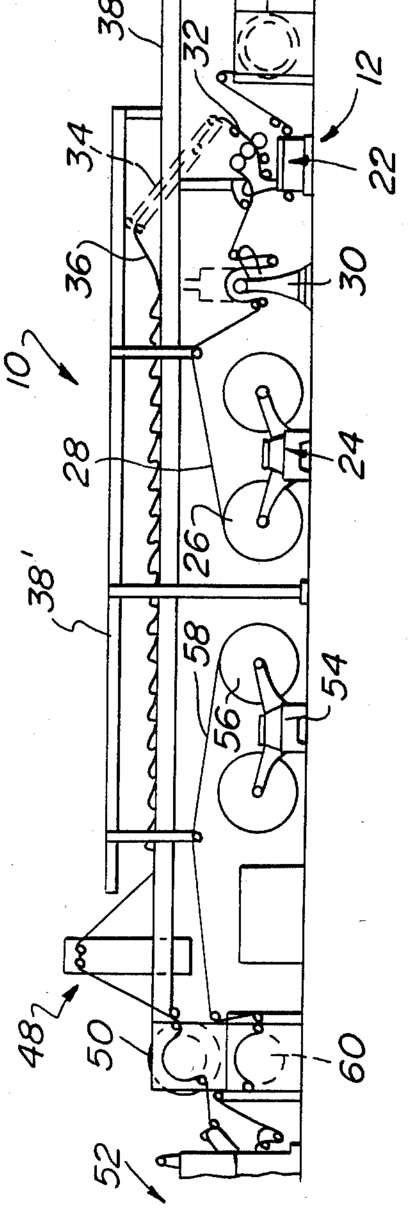
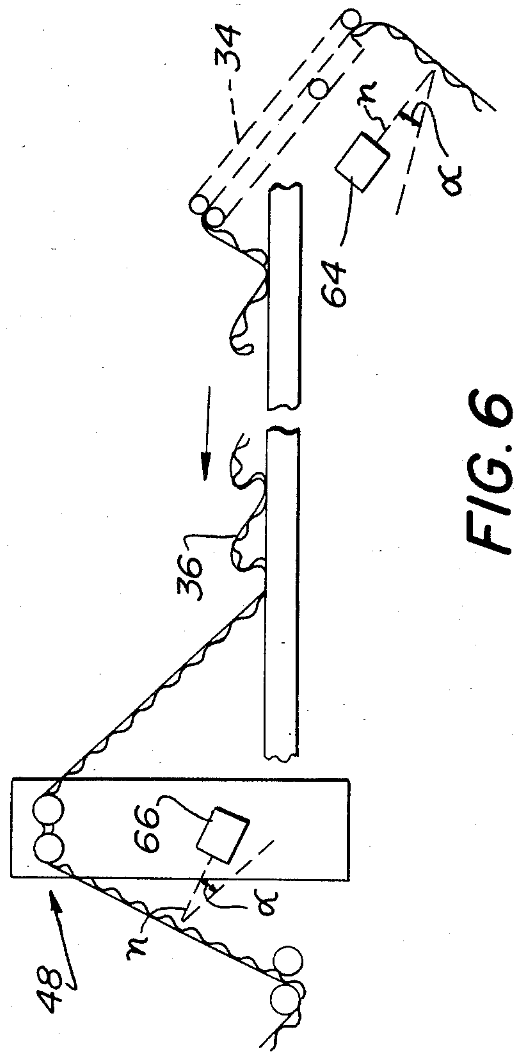
FIG. 6

PROXIMITY FLUTE DETECTION

BACKGROUND OF THE INVENTION

The present invention is directed to a method and apparatus for controlling the amount of single face corrugated paper board web (hereinafter "single face web") passing through the bridge of a corrugator. In particular, the invention is directed to method and apparatus for regulating the length of single face web on the bridge by detecting the flutes of the single face web at the bridge inlet and outlet without using gear wheels, friction-driven rollers or similar mechanical components.

In U.S. Pat. No. 3,966,518, a bridge control is described wherein the flutes in a single face web are detected at the bridge inlet and outlet. Separate counts are maintained of the flutes passing the bridge inlet and outlet. The difference between the counts is utilized to vary the speed of the single facer machine so as to ensure uniform transit time per unit length of single face web through the bridge. It is suggested therein that the flutes can be counted using cog or gear wheels meshing with the flutes of the single face web. A cog or gear wheel which may be utilized in the control is disclosed, for example, in U.S. Pat. No. 3,104,997. The number and spacing of the teeth on the cog or gear wheel is chosen to match the flutes of the single face web. When two or more single face webs having different flute types are to be processed by the corrugator, separate gear wheels must be provided for each flute so that a multiplicity of wheels must be maintained. The operator must be sure to select the correct wheel for the particular flute in the single face web being run. Considerable operating time may be lost while the gear wheels are changed to match the flutes of the new single face web. Moreover, the operator may select the wrong wheel, and the mistake may not be noticed until the web has been damaged.

This problem is especially likely to be encountered in corrugators which have been retrofitted with single facers provided by different manufacturers. For example, one single facer (machine of a corrugator) may be replaced by a machine of a different manufacturer. The single face web produced by the substitute machine may differ only slightly in the number of flutes per unit length. The slight difference is likely to go unnoticed, and the operator may attempt to utilize the original cog or gear wheel to count the new single face flutes. The resultant error in the flute count may go unnoticed and provide erroneous results.

In U.S. Pat. No. 3,966,518, it is recognized that the flutes may be counted optically, but, to date no system has been proposed to do this. In fact, the corrugator described in U.S. Pat. No. 3,966,518 is not capable of exercising the desired control except where the flute sensors, such as the cog or gear wheels, are matched to the specific flute configuration of the single face web being run.

Conventionally, four flute configurations are utilized in the corrugated paperboard industry: A-flute having 33 to 35 flutes per foot with a depth of 0.185 inch; B-flute having 47 to 50 flutes per foot with a depth of 0.097 inch; C-flute having 37 to 39 flutes per foot with a depth of 0.142 inch; and E-flute having 90 to 96 flutes per foot and a depth of 0.045 inch.

An object of the present invention is to provide a control for the amount of single face web passing through the corrugator bridge which requires no cog or gear wheels, friction-drive rolls or the like.

Another object of the invention is to provide a control which can be adjusted to accomodate a wide variety of single face web flute configurations without any loss in operating time.

A further object of the invention is to provide a method and apparataus for maintaining the length of single face web on the corrugator bridge at an optimal level selectable by the operator.

Another object of the invention is to provide a flute counter which counts flutes without contact between the counter and the single face web.

A further object of the invention is to provide a bridge control wherein the length of single face web in the bridge can be maintained constant with extreme accuracy.

Other objects and advantages appear hereinafter.

BRIEF SUMMARY OF THE INVENTION

Data representative of the number of flutes per unit length of a variety of flute types are stored in a memory. The flutes of the single face web being run are detected at the bridge inlet and outlet by a proximity type detector such as a photoelectric sensor or a sonic sensor. Any difference between the flute counts at the bridge inlet and outlet provides an indication of a corresponding change in the length of web stored in the bridge. The actual length is derived by retrieving the appropriate data from memory in response to a thumbwheel or keypad input and by multiplying the total flute count by the retrieved data. The product is then used to control the speed of the single facer machine by comparing the actual length in storage with a desired or set point length selectable by the operator.

For the purpose of illustrating the invention, there are shown in the drawings forms which are presently preferred; it being understood, however, that this invention is not limited to the precise arrangements and instrumentalities shown.

DESCRIPTION OF THE DRAWINGS

FIG. 1 is a diagrammatic representation of a corrugator including a single facer machine, bridge and double facer machine.

FIG. 6 is a diagram showing the arrangement of the proximity type flute detectors in relation to the flutes of the single face web in the corrugator shown in FIG. 1.

DETAILED DESCRIPTION OF THE INVENTION

Figure 2:
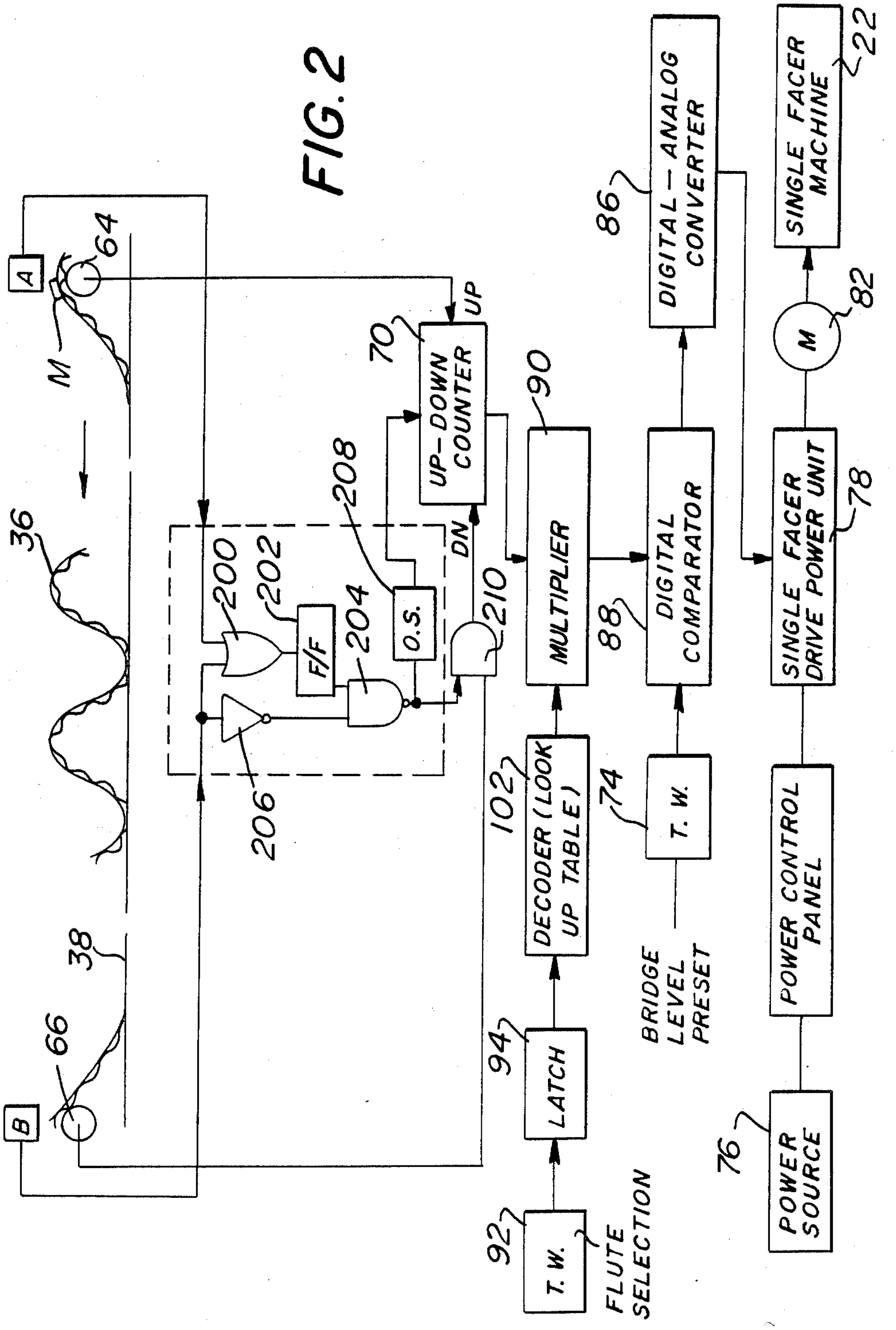
FIG. 2 is a block diagram of the control of the present invention utilizing proximity type flute detectors.

Referring to the drawings wherein like numerals indicate like elements, there is shown in FIG. 1 a corrugator designated generally as 10. Corrugator 10 at its upstream or inlet end includes at least one single facer system 12.

The single facer system 12 includes a first mill roll stand (not shown) for supporting rolls of a liner 16. The liner 16 is fed through a tension control device 18 and is then fed through a preheater 20. The preheated liner 16 is then fed to a single facer machine 22.

A second mill roll stand 24 is provided for supporting rolls 26 of a corrugating medium 28. The corrugating medium 28 is fed through a preconditioner 30 having a steam shower system. The preconditioned corrugating medium 28 is then fed to the single facer machine 22 where it is corrugated and adhesively bonded to the liner 16, forming a web 36 of single face paperboard. At the discharge side of the single facer machine 22, there may be provided a web break detector 32 for detecting the presence or absence of the web 36 of single face paperboard. The web 36 is fed by conveyor 34 to the lower level 38 of an adjacent bridge. If a second single facer system is utilized in conjunction with system 12, the single face web from the second system is fed to the upper level 38' of the bridge. Two single facer systems would be employed, for example, to produce double wall corrugated board.

As the web 36 leaves the bridge 38 it extends around the guide surface on the guide 48. Thereafter, the web 36 is heated by contact with the drum 50 which is heated in any conventional manner, such as by steam. The preheated web 36 is then fed to the double facer machine 52. If two single face systems are employed simultaneously, the double facer machine 52 processes both webs.

A mill roll stand 54 is situated beneath the bridge 38 and supports one or more rolls 56 of a second liner 58. The liner 58 is preheated such as by partially extending around heated drum 60. At the entrance to the double facer machine 52, a glue machine applies an adhesive bonding agent to the crests of the flutes on the web 36 which are then bonded to the liner 58 in the double facer machine.

The double facer machine 52 includes a source of heat below the web of paperboard. The source of heat is preferably a plurality of heat chests or plates which may be selectively moved to a minimal heat transfer position as desired. In this regard, the selectivity is provided to facilitate the proper heat transfer as a function of speed with the object of attaining uniform moisture level in the paperboard to prevent warp.

Referring to FIG. 2, a proximity type sensor 64 such as a retroreflective optical scanner having a self-contained light source and photocell is diagrammatically illustrated at the inlet end of the bridge 38 adjacent an edge of the single face web 36. The optical scanner device 64 includes a light source and photocell arranged to detect the passage of each of the flutes of the single face web 36 past a preselected location at the inlet end of the bridge. The optical scanner 64 generates a pulse signal for each detected flute passing through its field of view. A similar optical scanner 66 is provided at a preselected location relative to the outlet end of the bridge 38 to detect the passage of each flute of the single face web 36. The optical scanner 66 generates a pulse signal for each detected flute.

The pulse signals generated by scanners 64 and 66 are fed to an up-down counter 70. The pulses from scanner 64 are counted up by counter 70 while the pulses from scanner 66 are counted down so as to obtain a net count indicative of the difference betwen the numbers of pulses generated by the scanners at any instant of time.

A localized region of the single face web 36 is provided with a metallized tape M which is sensed by proximity switches A and B as the web traverses scanners 64 and 66. The proximity switches A and B may be of the magnetic pick-up type and are located adjacent scanners 64 and 66 respectively so as to be at the same lateral positions (left-right in FIG. 2) as the scanners. Upon sensing presence of the tape M, each proximity switch generates a level transition at its output. Each switch generates an opposite level transition thereafter when it senses absence of the tape.

Counter 70 is calibrated to the actual length of single face web on bridge 38 by resetting the counter to zero and then enabling the counter to count up while inhibiting the counter from counting down. As the single face web 36 is fed from scanner 64 to scanner 66, proximity switch A senses the tape M and the level of the switch output changes. An OR gate 200 in a Calibrate Logic circuit senses the level transition at the switch A output and toggles a flip-flop 202. The output of the flip-flop changes level accordingly. An inverter 206 inverts the output of switch B, which has not yet undergone a level transition, to prime NAND gate 204. When the output level of switch A changes, the output of NAND gate 204 undergoes a level transition which triggers a one shot 208. The one shot generates a brief pulse to reset up-down counter 70. The NAND gate 204 output also inhibits AND gate 210, preventing the AND gate from passing any pulses generated by scanner 66 to up-down counter 70. As a result, the counter counts up only, in response to the pulses generated by scanner 64.

When proximity switch B senses the tape M, the count maintained by counter 70 indicates the actual number of flutes of single face web on the bridge 38. Upon sensing the tape M, the switch B output changes level causing the OR gate 200 output to again toggle flip-flop 102. The flip-flop output therefore reverts to its original level. The output of NAND gate 204 also reverts to its original level, enabling AND gate 210 to pass the scanner 66 output pulses to counter 70. Thereafter, the counter 70 counts up and down in response to the pulse outputs of scanners 64 and 66 respectively to provide a net count indicative of the actual number of flutes of single face web on bridge 38 at any instant of time.

The output of counter 70 is a multiple bit digital signal which is fed to a multiplier 90. The multiplier 90 converts the output of counter 70 (actual number of flutes of single face web on bridge 38) to a multiple bit digital signal which represents the actual length of single face web on bridge level 38. In particular, the multiplier 90 multiplies the output of counter 70 by a number determined by the output of flute selection thumb wheel switches 92.

A number of single face webs may be run through bridge 38 at different times, and each single face web may have a different flute configuration. Thus, the number of flutes per unit length of single face web may vary from web to web. The appropriate number for the particular web being run is determined by the setting of the flute selection thumb wheel switches 92. More specifically, the flute selection thumbwheel switches 92 are manipulated by the operator to a setting which identifies the particular type (flute configuration) of single face web being run. The output of thumb wheel switches 92 is stored temporarily in latch 94. The latch output is fed to a decoder or look up table 102 which converts the latch output to a multiple bit digital signal that is compatible with the output of up-down counter 70. The decoder or look up table output represents the number of flutes per unit length for the flute configuration indicated by thumb wheel switches 92.

The output of multiplier 90, representing the actual length of single face web on bridge 38, is fed to a digital difference comparator 88. The desired length of single face web on the bridge is set by the operator via bridge level preset thumb wheel switches 74. The comparator 88 compares the desired or set point length indicated by thumb wheel switches 74 with the actual length signal from multiplier 90 to generate a digital discrepancy or error signal.

The digital discrepancy or error signal is converted by a digital-analog converter 86 to an analog control signal which is transmitted to the single facer drive control unit 78. The single facer drive control unit controls the speed of a motor 82 on the single facer machine 22. The control signal increases or decreases the speed of the single facer machine 22 to maintain a constant length (the desired or set point length) of web 36 on the bridge 38.

The single facer machine 22 may run at a speed which is higher than, even with or lower than the speed of the double facer machine 52 in order to maintain the constant length of web 36 on bridge 38. The operators, based on past experience with the particular single face web and liner being run, would select an appropriate amount of storage of web 36 on bridge level 38 by setting the digital thumbwheel switches 74. The operation of the single facer drive power unit 78 and power source 76 in regulating the motor 82 is described in detail in U.S. Pat. No. 3,966,518 and need not be described herein.

Figure 3A:
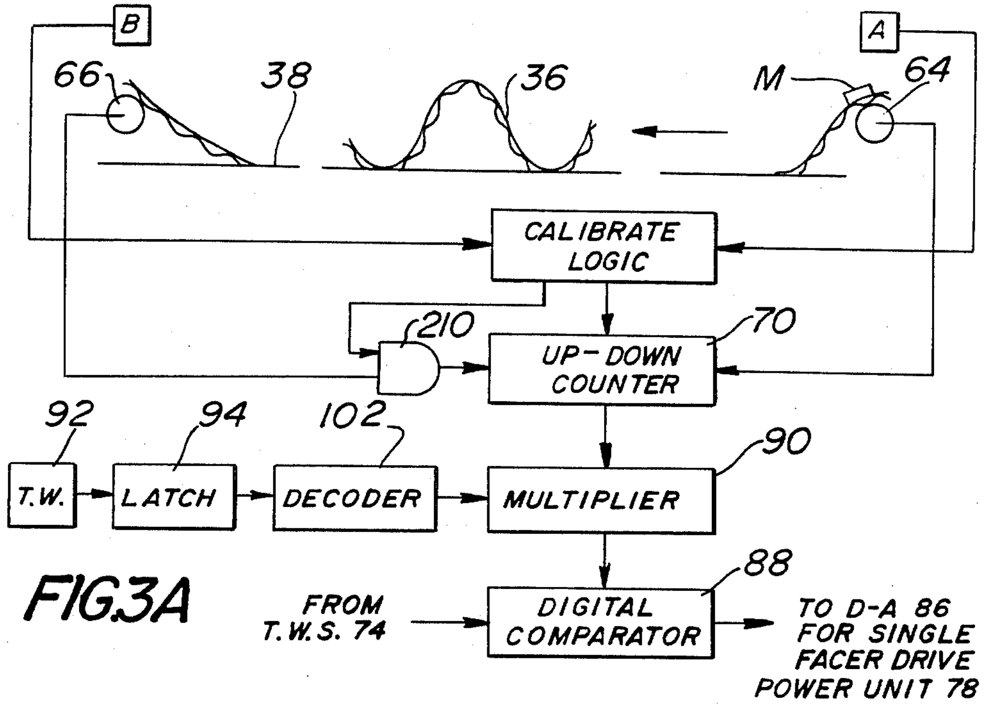
FIGS. 3A and 3B comprise a block diagram of the control of the present invention in connection with dual single facer machines.
Figure 3B:
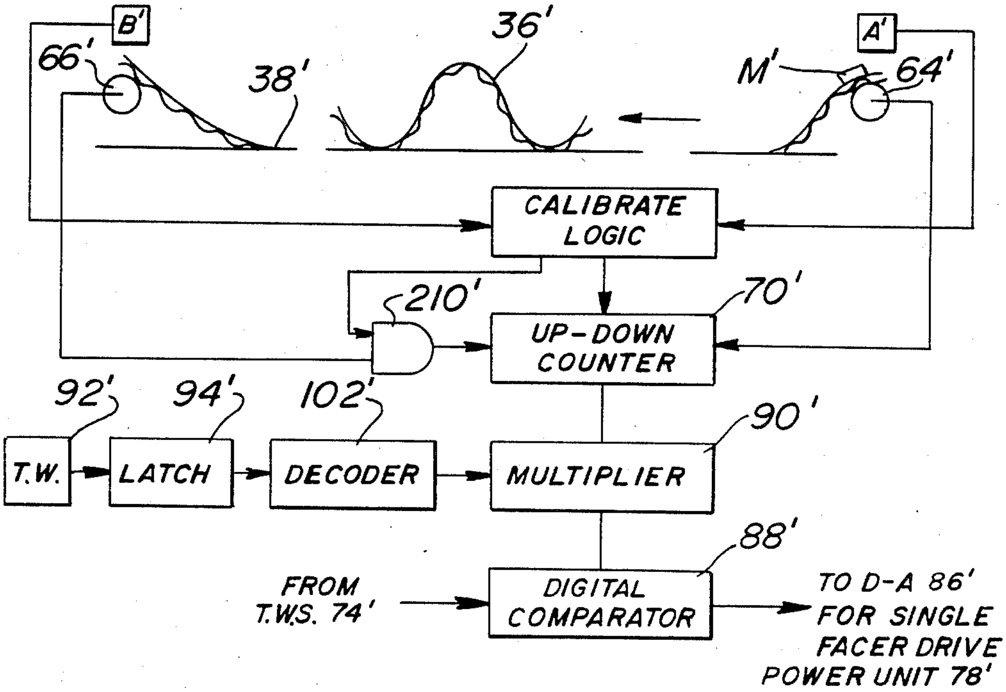

Referring to FIGS. 3A and 3B, there is shown an embodiment of the invention wherein dual single facer systems are employed to produce double wall board. Each single face web 36, 36' is fed to a separate bridge of a dual corrugator machine. Optical scanners 64, 66 count the flutes of single face web 36 at the inlet and outlet of bridge 38 and optical scanners 64', 66' count the flutes of single face web 36' at the inlet and outlet of the corrugator upper bridge 38'. The flute configuration of single face web 36 may differ from that of single face web 36'. In the embodiment shown in FIGS. 3A and 3B, separate control elements 74, 74', 88, 88' and 86, 86' are associated with each single facer drive power unit 78, 78'.

Figure 4:
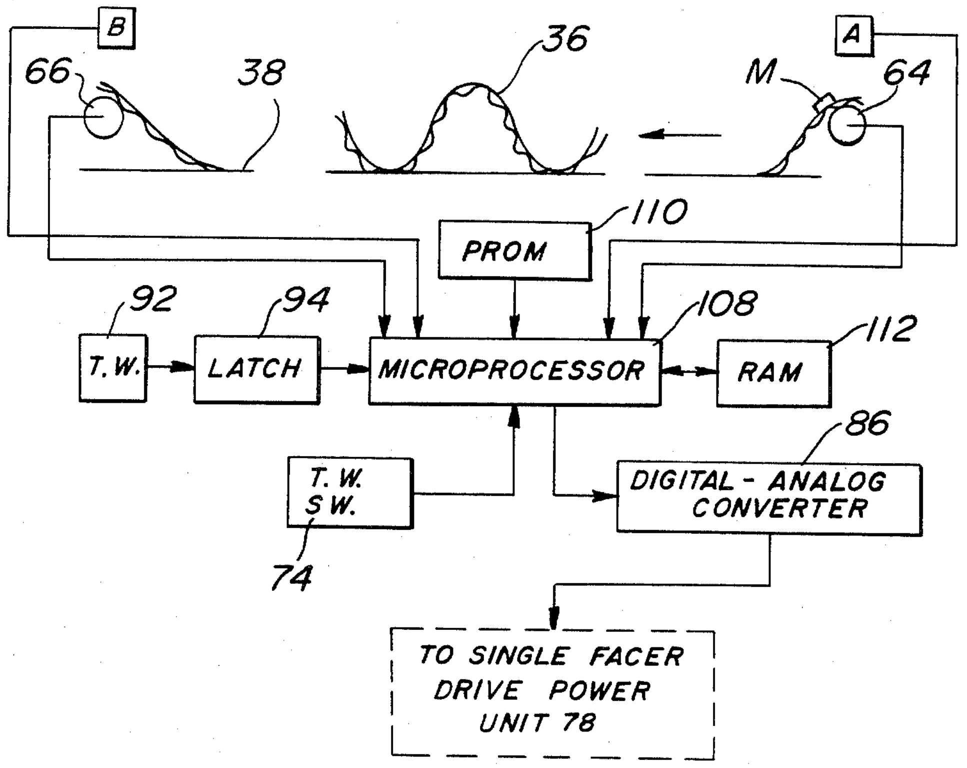
FIG. 4 is a block diagram of a microprocessor control according to the present invention.

Referring to FIG. 4, there is shown a microprocessor embodiment of the circuit shown in FIG. 2. The microprocessor 108 is programmed according to a program stored in PROM 110. The microprocessor counts the pulses generated by scanner 64 (up) and the pulses generated by scanner 66 (down) so as to obtain a net count indicative of the difference between the numbers of pulses generated by the scanners at any instant of time. The microprocessor is also programmed to count up pulses generated by scanner 64 upon detection of the metallic tape M by proximity switch A (until the tape is detected by proximity switch B) so as to obtain a calibration count representative of the actual number of flutes of single face web 36 on bridge 38 in the manner already described. The microprocessor thereafter obtains the net count of pulses from scanners 64, 66 and increments or decrements the calibration count by the net count. The incremented/decremented count represents the actual number of flutes of single face web 36 on the bridge at any instant of time.

Data representative of the number of flutes per unit length of single face web for a variety of webs is stored in RAM 112. The appropriate data corresponding to the number of flutes per unit length of the single face web being run at any particular time is retrieved from the correct address location in RAM 112 by the microprocessor 108 in response to the latched output of flute selection thumb wheel switches 92. The microprocessor multiplies the number retrieved from RAM 112 by the incremented/decremented count. The product represents the actual length of single face web on the bridge at any instant of time.

The output of bridge level preset thumbwheel switches 74 is compared digitally by the microprocessor to the product of the incremented/decremented count and the number retrieved from RAM 112. The difference between the output of bridge level preset thumb wheel switches 74 and the product is transmitted by the microprocessor to digital-analog converter 86 which controls the single facer drive power unit 78 as previously described to ensure a constant amount of web storage on the bridge.

Figure 5A:
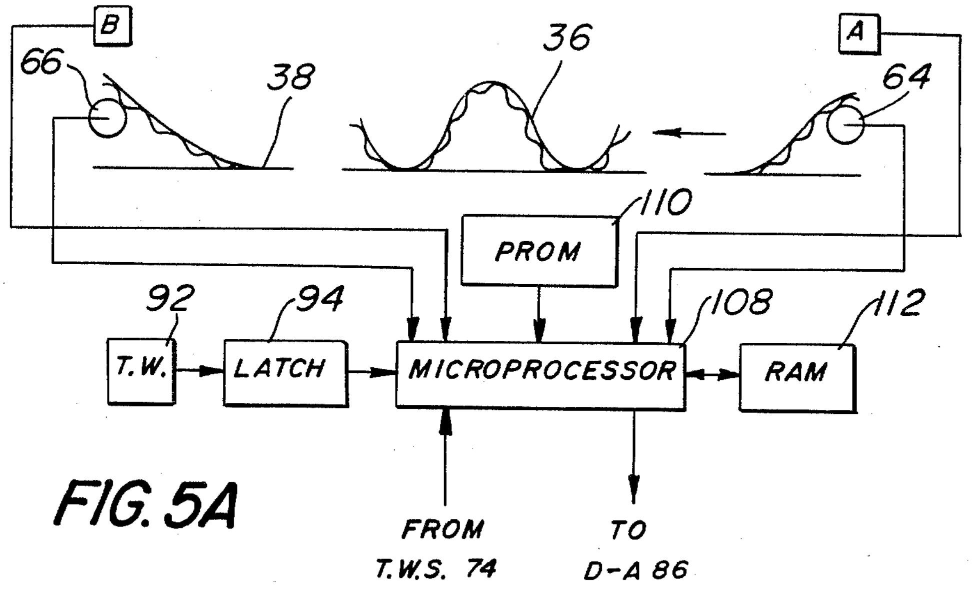
FIGS. 5A and 5B comprise a block diagram of a microprocessor control according to the invention in conjunction with dual single facer machines.
Figure 5B:
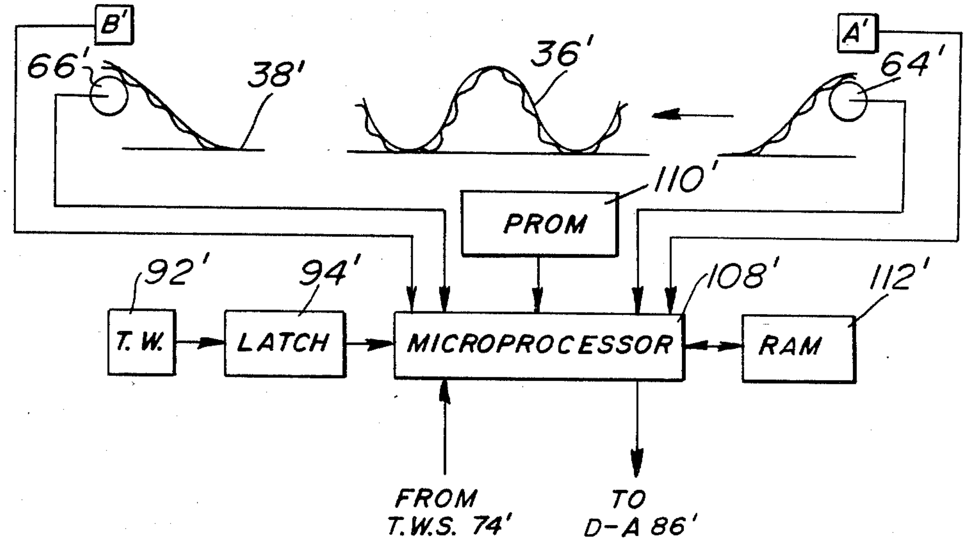

Referring to FIGS. 5A and 5B, there is shown a block diagram of a microprocessor embodiment of the dual single facer machine control in FIGS. 3A and 3B. The latched output of the flute selection thumb wheel switches 92 is used by the microprocessor 108 to address the RAM 112 and retrieve the appropriate data representative to the number of flutes per unit length of the single face web being run on bridge 38. The latched output of thumb wheel switches 92' is used by the microprocessor 108' to address the RAM 112' and retrieve the appropriate data representative of the number of flutes per unit length of single face web being run on bridge 38'. The microprocessors 108, 108' function as already described to generate the inputs to digital-analog converters 86, 86' respectively.

Referring to FIG. 6, there is shown a preferred arrangement of the optical scanners 64, 66 relative to the flutes of the single face web 36 being run on bridge 38, a like arrangement of scanner 64', 66' being utilized for single face web 36' if dual single facer systems are employed. In the arrangement shown in FIG. 6, each optical scanner faces the fluted surface of the single face web at approximately $\alpha = 20°$ from the normal n to the surface. It is understood, however, that other arrangements and orientations of scanners may be employed as well within the spirit and scope of the invention.

It should be appreciated that although various embodiments of the invention have been described in terms of an up-down counter for counting the pulse outputs of optical sensor devices, a pair of separate counters could be used for the same purpose. Thus, each counter would be associated with a separate optical scanner, and the difference between the counts maintained by the separate counters would be ascertained by a digital comparator. The output of the digital comparator would be multiplied by a number representative of the appropriate number of flutes per unit length of web, which number is derived from a look up table or RAM based on the thumb wheel switch output as previously explained.

Similarly, although the invention has been described in terms of optical scanners for counting the flutes of the single face web, other proximity type sensors may also be employed in order that no mechanical parts such as cog or gear wheels need be replaced to accommodate a change in the flute configuration. A sonic detector could, for example, be substituted for each of scanners 64, 66 and 64', 66'. The sonic detector would produce the pulse outputs representative of the detected flutes at the bridge inlet and outlet.

In addition, it should be understood that the thumb wheel switches may be replaced by a keypad or similar data entry device for selecting the appropriate flute configuration or bridge level preset without exceeding the scope of the invention.

It can be appreciated that the invention eliminates the use of the cog or gear wheel now widely employed in the industry. Thus, it is unnecessary to stop the corrugator to replace or otherwise change gear wheels when the flute configuration is changed.

The present invention may be embodied in other specific forms without departing from the spirit or essential attributes thereof and, accordingly, reference should be made to the appended claims, rather than to the foregoing specification, as indicating the scope of the invention.

I claim:

1. A method of regulating the length of fluted web stored in a bridge, comprising:
- optically detecting the passage of discrete web flutes at the inlet and outlet of the bridge,
- maintaining a count of the number of flutes detected at said bridge inlet and said bridge outlet;
- computing the difference between the counts,
- selectively generating a signal having a value proportional to the number of flutes per unit length of the web,
- converting the difference count to a signal representative the actual length of web stored in the bridge by multiplying the difference count by said value,
- generating a set point signal representative of desired length of fluted web to be stored on the bridge,
- comparing the signal representative of actual length of web stored on the bridge to said set point signal and generating an error signal based on the comparison, and
- varying the speed of the web in response to said error signal.

2. A method according to claim 1 wherein said step of selectively generating said signal includes selectively retrieving from memory data having a value proportional to the number of flutes per unit length of web.

3. A method of regulating the length of fluted web stored in a bridge, comprising:
- sonically detecting the passage of discrete web flutes at the inlet and outlet of the bridge,
- maintaining a count of the number of web flutes detected at the bridge inlet and the bridge outlet,
- computing the difference between the counts,
- selectively generating a signal having a value proportional to the number of flutes per unit length of the web,
- converting the difference count to the actual length of web stored in the bridge by multiplying the difference count by said value;
- generating a set point signal representative of desired length of fluted web to be stored in the bridge,
- comparing the signal representative of actual length of web stored on the bridge to said set point signal and generating an error signal based on the comparison, and
- varying the speed of the web in response to said error signal.

4. A method according to claim 3 wherein said step of selectively generating said signal includes retrieving from memory data proportional to the number of flutes per unit length of web.

5. Apparatus for regulating the length of fluted web stored in a bridge, comprising:
- first optical sensor device disposed at the inlet of the bridge for detecting the passage of discrete web flutes,
- second optical sensor device disposed at the outlet of the bridge for detecting the passage of discrete web flutes,
- means for obtaining a count of the difference between the number of flutes detected at the bridge inlet and the number of flutes detected at the bridge outlet by said optical sensor devices,
- means for selectively generating a signal representative of the number of flutes per unit length of web,
- means for generating a signal representative of the actual length of web stored in the bridge based on said difference count and said selectively generated signal,
- means for generating a set point signal representative of desired length of fluted web to be stored on the bridge,
- means for comparing said signal representative of actual length of web stored in the bridge with said set point signal and for generating an error signal based on the comparison, and
- means for varying the speed of the web based on said error signal.

6. Apparatus according to claim 5 wherein each of said first and second optical sensor devices includes a light source and a photocell positioned so as to face the fluted surface of the web at approximately 20° with respect to the normal to the fluted surface.

7. Apparatus according to claim 5 wherein said means for selectively generating said signal representative of the number of flutes per unit length of web includes memory for storing data representative of the number of flutes per unit length of web, a data entry device, and means for selectively retrieving data from said memory in response to the data entry device output.

8. Apparatus according to claim 7 wherein said memory comprises RAM.

9. Apparatus for regulating the length of fluted web stored in a bridge, comprising:
- first sonic sensor device disposed at the inlet of the bridge for detecting the passage of web flutes,
- second sonic sensor device disposed at the outlet of the bridge for detecting the passage of web flutes,
- means for obtaining a count of the difference between the number of flutes detected at the bridge inlet and the number of flutes detected at the bridge outlet by said sonic sensor devices,
- means for generating a signal representative of the number of flutes per unit length of web,
- means for generating a signal representative of the actual length of web stored in the bridge based on said difference count and said selectively generated signal,
- means for generating a set point signal representative of desired length of fluted web to be stored on the bridge,
- means for comparing said signal representative of actual length of web stored in the bridge with a set point signal and for generating an error signal based on the comparison, and
- means for varying the speed of the web-based on said error signal.

10. Apparatus according to claim 9 wherein said means for selectively generating said signal representative of the number of flutes per unit length of web includes memory for storing data representative of the number of flutes per unit length of web for one or more webs, a data entry device, and means for selectively retrieving data from said memory in response to the data entry device output.

11. Apparatus according to claim 10 wherein said memory comprises RAM.

12. Method of regulating the length of fluted web stored in a bridge, comprising:

detecting the passage of web flutes at the inlet and outlet of the bridge by directing radiant energy at the web flutes and detecting radiant energy reflected from the flutes, maintaining a count of the number of flutes detected at the inlet of the bridge and the number of flutes detected at the outlet of the bridge, computing the difference between the counts, selectively generating a signal indicative of the number of flutes per unit length of web, generating a signal indicative of the actual length of web stored in the bridge based on said difference count and said selectively generated signal, generating a set point signal representative of desired length of fluted web to be stored on the bridge, comparing said signal indicative of actual length of web stored in the bridge to said set point signal and generating an error signal based on the comparison, and varying the speed of the web based on said error signal.

13. Method according to claim 12 wherein said step of selectively generating said signal includes storing in memory data representative of the number of flutes per unit length of web, and selectively retrieving said data from memory.

14. Apparatus for regulating the length of fluted web stored in a bridge, comprising:

first proximity sensor disposed at the bridge inlet for detecting the passage of discrete web flutes without contacting the web, second proximity sensor disposed at the bridge outlet for detecting the passage of discrete web flutes without contacting the web, means responsive to said first and second proximity sensors for obtaining a count of the difference between the number of flutes detected at the bridge inlet and the number of flutes detected at the bridge outlet, means for selectively generating a signal representative of the number of flutes per unit length of web, means for generating a signal representative of the actual length of web stored in the bridge based on the difference count and said selectively generated signal, means for generating a set point signal representative of desired length of fluted web to be stored on the bridge, means for comparing said signal representative of actual length of web stored in the bridge with said set point signal and for generating an error signal based on the comparison, and means for varying the speed of the web based on said error signal.

15. Method according to claims 1, 3 or 12 wherein said step of maintaining said count of the number of flutes detected at said bridge inlet and outlet includes:

detecting passage of a localized region of the web at the bridge inlet, initiating a count of the number of flutes detected at the bridge inlet upon detection of said web localized region at the bridge inlet, detecting passage of said web localized region at the bridge outlet, and initiating a count of the number of flutes detected at the bridge outlet upon detection of said web localized region at the bridge outlet.

16. Apparatus according to claims 5, 9 or 14, wherein said means for obtaining a count of the difference between the number of flutes detected at the bridge inlet and outlet, includes:

means for detecting passage of a localized region of the web at the bridge inlet, means for initiating a count of the number of flutes detected at the bridge inlet upon detection of said web localized region at the bridge inlet, means for detecting passage of said web localized region at the bridge outlet, and means for initiating a count of the number of flutes detected at the bridge outlet upon detection of said web localized region at the bridge outlet.

* * * * *